UNITED STATES PATENT OFFICE.

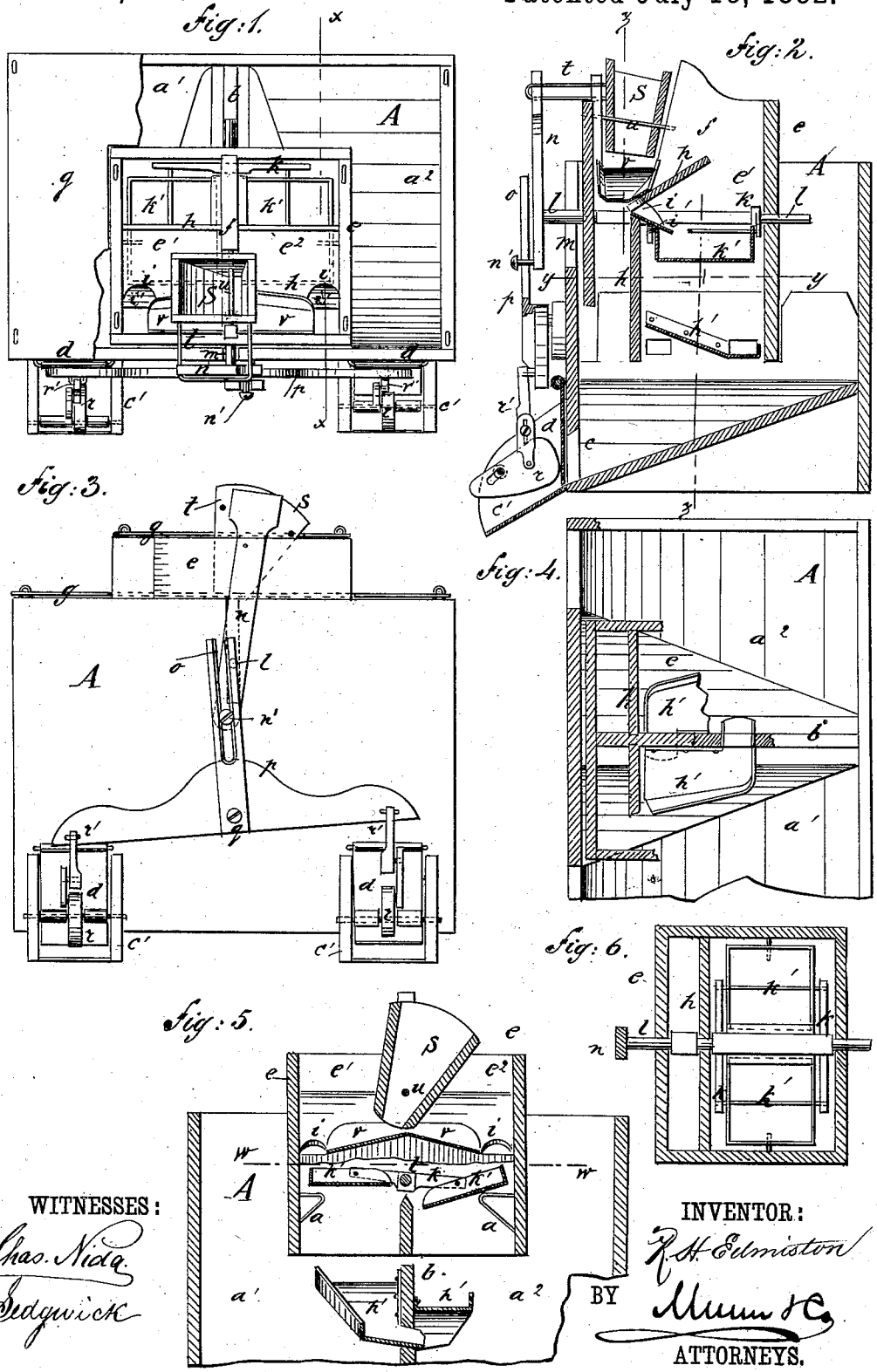

ROBERT H. EDMISTON, OF AMERICUS, KANSAS.

GRAIN-METER.

SPECIFICATION forming part of Letters Patent No. 261,516, dated July 18, 1882.

Application filed November 22, 1881. (No model.)

*To all whom it may concern:*

Be it known that I, ROBERT H. EDMISTON, of Americus, in the county of Lyon and State of Kansas, have invented a new and useful Improvement in Grain-Meters, of which the following is a full, clear, and exact specification.

The present invention is an improvement on the grain-meter shown in Letters Patent granted to me April 22, 1879, and has for its object to render the operation more perfect and reliable.

The invention consists in certain novel features of construction and combination of parts, hereinafter described and claimed.

In the accompanying drawings, Figure 1 is a plan view of the apparatus with the cover partially removed. Fig. 2 is a vertical section on line $x\ x$ of Fig. 1. Fig. 3 is a side elevation of the meter. Fig. 4 is a horizontal section on line $y\ y$ of Fig. 2. Fig. 5 is a vertical section on line $z\ z$ of Fig. 2, and Fig. 6 is a horizontal section on line $w\ w$ of Fig. 5.

Similar letters of reference indicate corresponding parts.

A is a bin, preferably of rectangular form, and divided in its lower portion by a cross-partition, $b$, into two compartments, $a'\ a^2$, of equal size. The bottoms of the compartments are inclined or hopper-shaped, and are provided with delivery-openings $c\ c$, over which are gates $d$, hinged to open outward.

$c'\ c'$ are spouts from the openings $c$.

The partition $b$ is slotted to sustain an inner box or hopper, $e$, that is adjustable up and down on the partition. A partition, $f$, divides the box $e$ into compartments $e'\ e^2$, which communicate with the respective compartments $a'\ a^2$. $h$ is a partition at right angles to partition $f$, forming passages from the spaces $a'\ a^2$ to the upper part of box $e$.

$i\ i$ are openings in the upper part of partition $h$, fitted with spouts $i'$.

$k$ is a rocking frame hung in box $e$ on a cross-axis, $l$, so as to oscillate.

$k'\ k'$ are pans hung by pivots at the opposite sides of frame $k$ and beneath the spouts $i'$. These pans are open at the top and one end, and beneath them are fixed projections $a$, which cause each pan to tilt when it is moved down by the oscillation of frame $k$. The axis $l$ of frame $k$ extends through the side of hopper $e$ and through a slot, $m$, in the side of bin A, and carries a double-crank arm, $n$, one end of which has a pin, $n'$, entering the slot $o$ of one arm of the three-armed lever $p$. This lever $p$ is hung by a fulcrum, $q$, on the side of bin A, and its other two arms connect by links $r'\ r'$ with cam-dogs $r\ r$, which are hung by suitable pivots in the delivery-spouts $c'$.

$s$ is the feed-spout, hung by an axis, $u$, in a slot of partition $f$ in hopper $e$, so that the spout can oscillate from side to side and deliver the grain into either of the compartments $e'\ e^2$.

$t$ is a yoke fixed on spout $s$ and extending around the upper end of lever $n$.

$v\ v$ are spouts or chutes fixed beneath spout $s$, and inclined in opposite directions, so as to carry the grain from the spout $s$ to the spaces $e'\ e^2$.

$h'\ h'$ are spouts fixed on partition $b$ at opposite sides, and extending through the partition. These are placed to receive the grain from the pans $k'$. The bin A and hopper $e$ are provided with removable covers $g$ for excluding dust.

In the operation of the machine, spout $s$ being in position to feed the grain to one compartment, $e'$ or $e^2$, of hopper $e$, the grain passes to one compartment, $a'$ or $a^2$, of the bin. The gate $d$ of that compartment is kept tightly closed by the dog $r$, which is pressed against the gate in consequence of the inclined position of lever $p$. As soon as the bin fills up to the bottom of hopper $e$ the grain will rise in the passage at the side of partition $h$ until it reaches the opening $i$, when it will run to the pan $k'$ at that side which is elevated until there is sufficient weight to bear the pan down. This rocks the frame $k$, the spout $s$ is swung to the opposite side, and the lever $p$ shifted. The grain then passes to the other compartment, the gate of which is clamped by the movement of the lever, while the gate of the first-filled compartment being released the grain runs out. By raising and lowering the hopper $e$ the quantity at each discharge can be accurately regulated.

As shown in Fig. 3, there is a gage on the side of the hopper $e$, which is for use in regulating the hopper.

Screws or other devices may be combined with the hopper for raising and lowering it.

The spouts $h'$ carry the grain discharged from pans $k'$ to the compartment being filled, so that all grain that is above the opening $i$, be it more or less, is thus discharged.

Having thus fully described my invention, I claim as new and desire to secure by Letters Patent—

1. In a grain-meter, the combination, with the bin A, provided with the compartments $a'$ $a^2$, of the adjustable hopper $e$, provided with the compartments $e'$ $e^2$, the partition $h$, having openings $i$, and the oscillating frame $k$, carrying the pans $k'$, substantially as herein shown and described, whereby the quantity at each discharge can be accurately regulated by raising or lowering the said hopper, as set forth.

2. The combination of spout $s$, hopper $e$, provided with chutes $v$ and apertured partition $h$, oscillating frame $k$, pans $k'$, and divided bin A, substantially as shown and described.

3. In grain-meters, the spouts $h'$, combined with divided bin A, rocking frame $k$, pans $k'$, and hopper $e$, substantially as and for the purpose set forth.

4. In grain-meters, the combination, with the bin A, provided with the spouts $c'$, having hinged gates $d$, the oscillating frame $k$, and the feed-spout $s$, provided with the yoke $t$, of the double-crank arm $n$, the three-armed lever $p$, the link $r'$, and dogs $r$, substantially as and for the purpose set forth.

ROBERT H. EDMISTON.

Witnesses:
J. H. HIBBEN,
R. H. MAHAN.